Sept. 19, 1961         F. C. DU GRENIER ET AL         3,000,485
                    MULTI-PRICE VENDING MACHINE
Filed May 4, 1956                              9 Sheets-Sheet 7

Francis C. DuGrenier
Frank B. Perri
   Inventors
by Porter, Chittick & Russell
       Attorneys

Sept. 19, 1961 F. C. DU GRENIER ET AL 3,000,485
MULTI-PRICE VENDING MACHINE
Filed May 4, 1956 9 Sheets-Sheet 9

Francis C. DuGrenier
Frank B. Perri
Inventors
by Porter, Chittick & Russell
Attorneys :::::: {.columns}
::: {.column}

United States Patent Office

3,000,485
Patented Sept. 19, 1961

3,000,485
MULTI-PRICE VENDING MACHINE
Francis C. Du Grenier, 15 Hale St., Haverhill, Mass., and Frank B. Perri, Groveland, Mass.; said Perri assignor to Blanche E. Bouchard, Haverhill, Mass.
Filed May 4, 1956, Ser. No. 582,759
2 Claims. (Cl. 194—92)

This invention relates to vending machines and more particularly to a vending machine adapted to selectively vend articles of different prices. This invention constitutes an improvement of the invention described in our Patent No. 2,726,749 issued December 13, 1955 for Coin Controlled Mechanism for Vending Machines.

The primary object of this invention is to provide coin controlled apparatus to vend articles at three different prices. For illustrative purposes, the mechanism is shown set up to vend articles such as cigarettes for 25¢, 30¢, and 35¢, but by simple modification it can be made to vend articles at other prices. The mechanism as illustrated is designed to operate with a quarter alone, with a quarter and a nickel, with a quarter and two nickels, and with a quarter and a dime.

The improved coin controlled mechanism is described and illustrated herein as it is used in a vending machine of the vertical column-in-line type having a plurality of vertical columns for storing articles to be vended, each column having associated therewith a package ejector and a handle for operating the ejector. It is to be understood, however, that the coin controlled mechanism is adapted to be used on other than the vertical columns-in-line type of vending machine.

Another object of this invention is to provide a coin controlled locking mechanism for a vending machine that is normally locked to prevent operation of the machine and which can be unlocked to permit operation of the machine only when a predetermined number of coins are inserted in the machine. If insufficient coins are inserted in the machine the locking mechanism will remain locked to prevent operation of the machine.

Other objects and many of the attendant advantages of this invention will be readily appreciated as the same becomes better understood by reference to the following detailed description when considered in connection with the accompanying drawings, wherein.

Before proceeding with the description it is to be noted that only so much of a conventional vertical columns-in-line type of vending machine is illustrated as is required to comprehend the present invention.

Looking now to FIGS. 1–9 there is shown a vending machine whose frame comprises a pair of vertical side panels 2 and 4, a rear panel 6 which curves forward at the bottom, and a horizontal floor member 10 having a depending wall 12 at its rear edge and an upstanding wall 14 at its front edge provided with a horizontal flange or lip 16. Depending wall 12 cooperates with side panels 2 and 4 and rear panel 6 to define a delivery chute 18. Also acting to support side panels 2 and 4 is a front brace member 20 having a vertical wall 22. Extending upwardly from floor member 10 is a flat wall member 24 and a plurality of U-shaped wall members 26 which cooperate to define a plurality of vertically extending compartments 28 for holding the articles to be vended. Wall member 24 is provided with slots 30 whose width and height are such as to admit only one article at a time.

Associated with each compartment 28 is an ejector member 32. Each ejector member is provided with a depending hook 34 which extends through slots 36 and 38 provided in floor 10 and depending wall 12 respectively. It is believed apparent from the relative positions of the ejector member 32 in FIGS. 2 and 3 that the slot 36 in floor member 10 extends from depending wall 12 to upstanding wall 14. Attached to each ejector member is an operating handle 40 provided with a suitable knob 42. Handles 40 project through suitable openings in walls 14 and 22.

The articles stored in the compartments 28 rest upon the ejector members. When these ejector members are drawn forward by handles 40 (see FIG. 3), the bottommost articles fall onto floor 10. When the ejector members are returned rearwardly to their original positions (FIGS. 1 and 2), they engage the bottommost articles and force them rearwardly through slots 30 into delivery chute 18 when they are directed to the customer.

Hooks 34 engage a shaft 46 attached at each end to an arm 48 which is itself attached to a stub shaft 50. Stub shafts 50 are journaled in side panels 2 and 4. The stub shaft 50 associated with panel 4 extends through the latter and is provided with a solid member rotatable therewith that comprises a ratchet arm 52, a spring connecting arm 54, and a crank arm 56 provided with a rotatable extension 58. A tension spring 60 is attached to arm 54 and also to panel 4. Spring 60 operates to urge shaft 46 counterclockwise in opposition to the force exerted by a hook 34 when its operating arm 40 is pulled forward. A spring biased pawl 64 cooperates with ratchet arm 52 to hold shaft 46 in a position intermediate the position shown in FIGS. 2 and 3 when the operating handle is released before completion of its forward stroke. The function of crank arm 56 and its rotatable extension 58 is explained hereinafter.

The structure just described is conventional and is illustrated and described in greater detail in our aforementioned Patent No. 2,726,749.

The coin-controlled operating mechanism and its associated apparatus now to be described are similar in many ways to the corresponding mechanism described and illustrated in that same patent. However, certain modifications and improvements have been effected according to the present invention which require a description of the improved mechanism as a whole rather than on a piecemeal basis.

Figure 1:
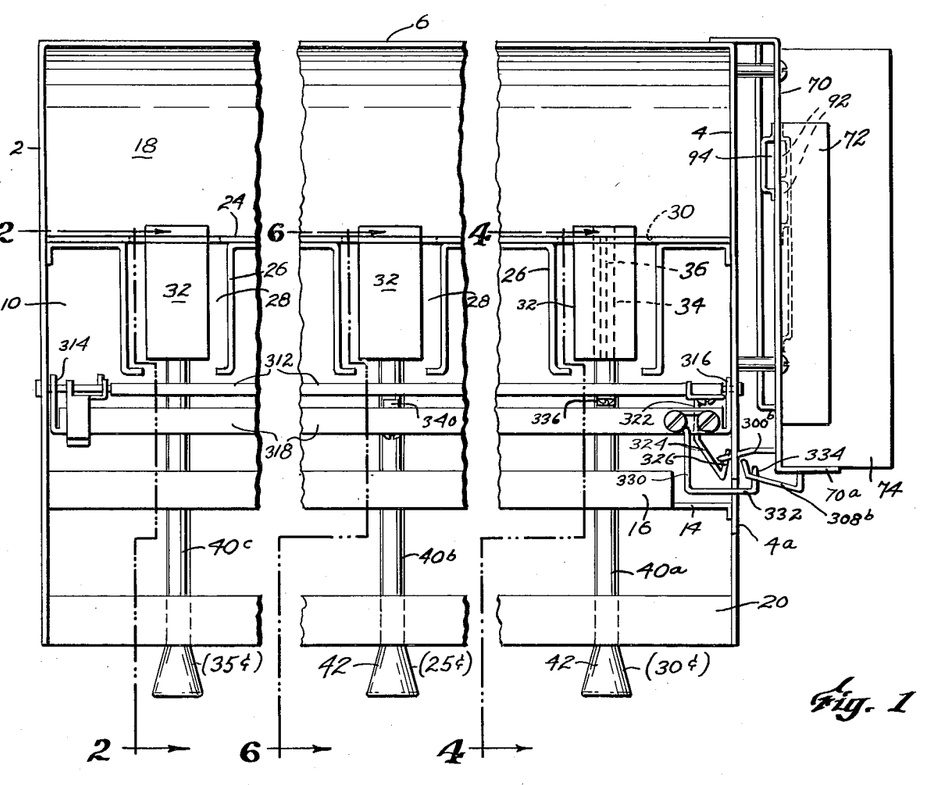
FIG. 1 is a plan view of a vending machine embodying the present invention with certain of the mechanisms being shown schematically to simplify the drawing.
Figure 2:
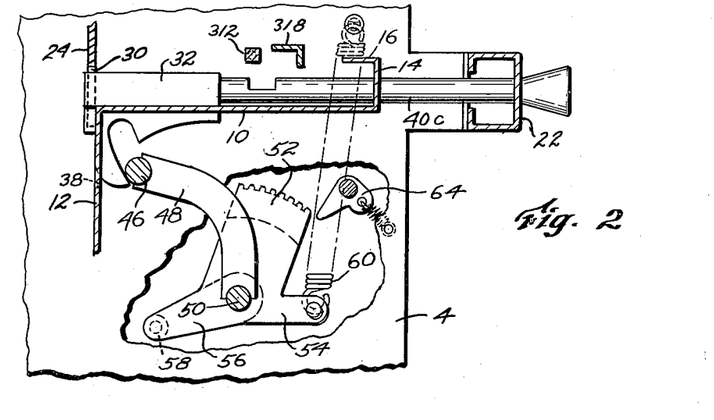
FIG. 2 is a sectional view in elevation taken along line 2—2 of FIG. 1.
Figure 3:
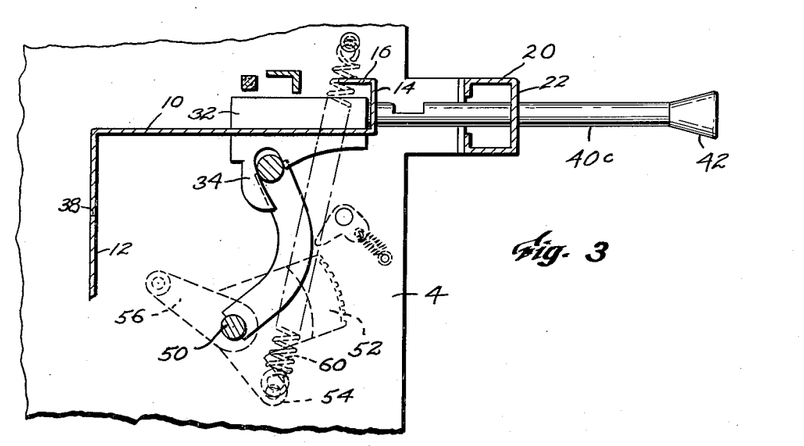
FIG. 3 is a view like FIG. 2, but with the operating handle pulled out.
Figure 8:
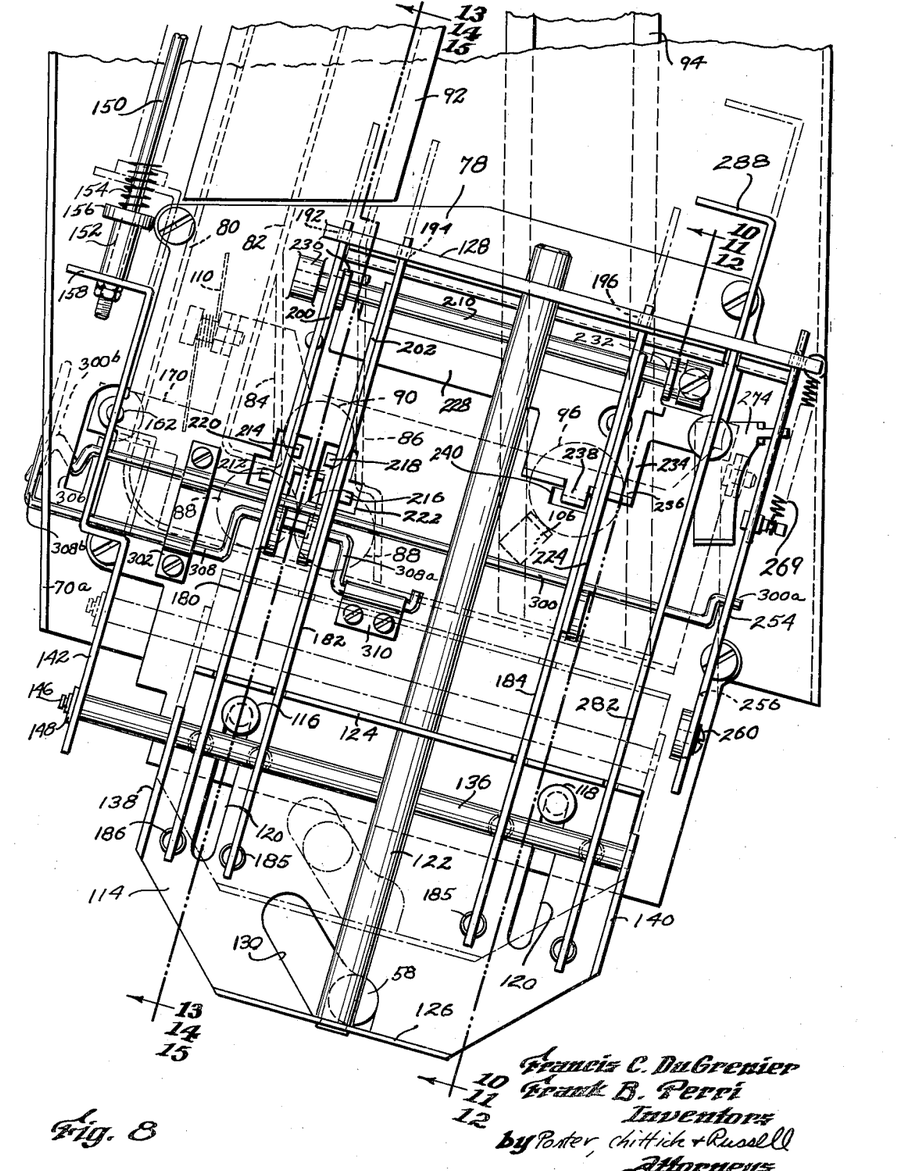
FIG. 8 is a side elevation looking from right to left in FIG. 1.
Figure 9:
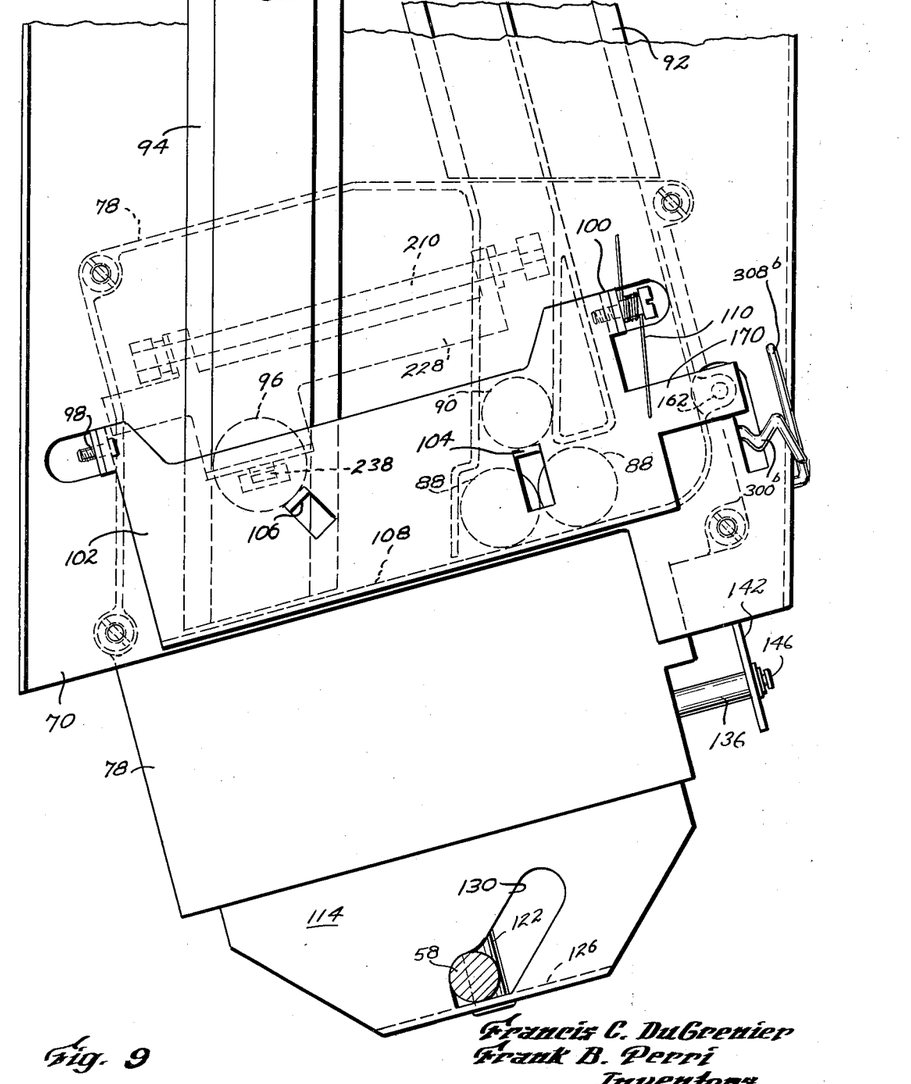
FIG. 9 is a reverse view of the panel shown in FIG. 8.

Looking now to FIGS. 1, 8 and 9 in particular, there is removably secured to side panel 4 a panel 70 which functions to mount a conventional slug rejecting mech-

:::
::::::

anism 72 schematically illustrated in FIG. 1, a coin-controlled operating mechanism 74, also schematically illustrated in FIG. 1, means (hereinafter described) for directing coins accepted by slug-rejecting mechanism 72 to the coin-controlled mechanism 74, and other means (illustrated only in part or not at all) not forming part of the present invention.

Mounted on the outside of panel 70 is a coin casting 78 having channels defining wall sections 80, 82, 84 and 86, for receiving coins of two different sizes, in this case, nickels 88 and dimes 90. Mounted above casting 78 is a coin chute 92 which acts to direct nickels 88 and dimes 90 from slug rejecting mechanism 72 to their appropriate channels in coin casting 78. Mounted on the rear side of panel 70 is a chute 94 which receives quarters 96 from slug rejecting mechanism 72. Quarters 96 are supported in chute 94 adjacent its bottom end by means hereinafter described.

Pivotally secured at 98 and 100 on the rear side of panel 70 is a plate 102 provided with a finger 104 which extends through an opening in the panel into the dime channel in coin casting 78. Plate 102 also has a second finger 106 which extends into quarter chute 94, and an inwardly extending flange or platform 108 at its bottom edge which extends through a suitable opening in panel 70 to act as a bottom closure for coin casting 78. Finger 104 acts as a supporting platform for dimes positioned in the casting. Finger 106 acts as a supporting platform for quarters in chute 94, and flange 108 acts as a supporting platform for nickels positioned in the coin casting. Plate 102 is biased by a spring 110 toward coin casting 78 so that normally coins will be supported by fingers 104, 106 and flange 108 until the plate has been pivoted away from panel 70 by means hereinafter described, whereupon the coins will fall out of the bottom of casting 78 and chute 94. Suitable apparatus (not shown) is provided to selectively direct the falling coins to a cash box or to delivery chute 18.

Slidably secured to the outer side of casting 78 adjacent its bottom end is an operating carriage 114. Studs 116 and 118 extend through elongated slots 120 in the carriage and operate to slidably attach the latter to casting 78. A rod 122 extends through and is fixedly secured to top and bottom flanges 124 and 126 of carriage 114. At its top end rod 122 slidably extends through a suitable opening provided in a horizontal flange 128 formed integral with casting 78. Adjacent the bottom end of rod 122 carriage 114 is provided with a large inclined slot 130 into which extends the rotatable extension 58 carried by crank arm 56. Thus when one of the handles is drawn forward by the customer, its hook 34 engages shaft 46 and draws it forward, thereby rotating shaft 50 and crank arm 56. As the latter rotates its extension 58 moves carriage 114 upwardly. When the operating handle is pushed rearwardly to return hook 34 to its original position, spring 60 pulls crank arm 56 back to its original position. This reverse movement of crank arm 56 causes its rotatable extension 58 to return carriage 114 to its original at-rest position.

Figure 14:
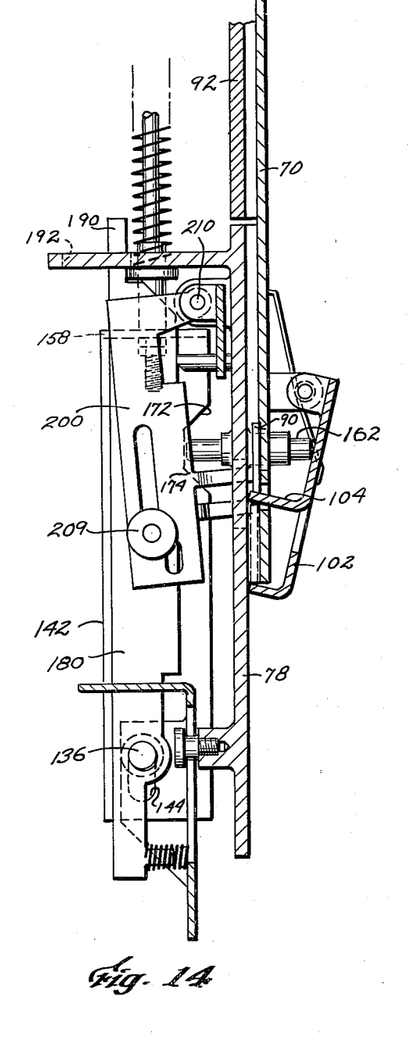
Figure 15:
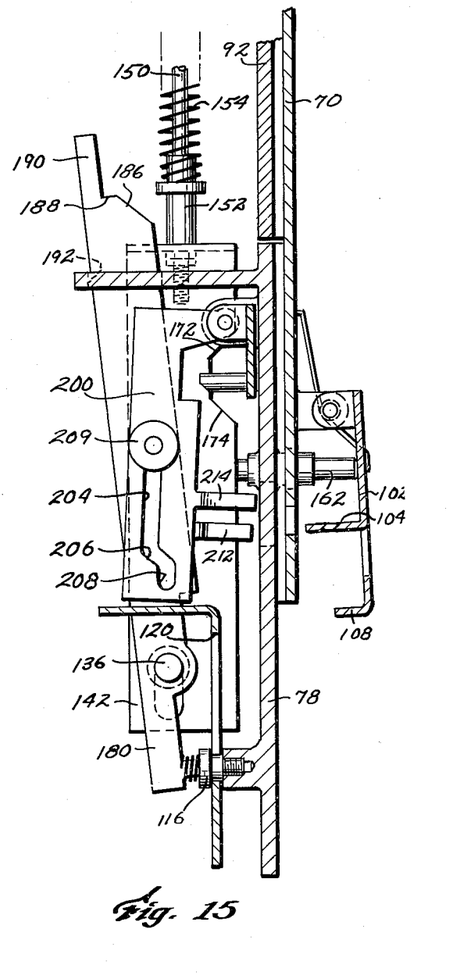

Extending transversely of carriage 114 is a rod 136. This rod is secured in flanges 138 and 140 of the carriage. As shown in FIGS. 8, 14, and 15, a flat rod 142 bent as shown is disposed adjacent the front edge of panel 70. The bottom end of rod 142 is provided with an elongated slot 144. A screw 146 having a washer 148 extends through slot 144 and is screwed in the end of rod 136, thereby providing a slidable connection between rod 142 and rod 136. At its upper end rod 142 is attached to a wire rod 150 whose upper end is attached to a coin return lever (not shown) adapted to be operated by the customer. A sleeve 152 is slidably mounted on rod 150. A spring 154 attached to rod 150 urges sleeve 152 downwardly relative to rod 150. Thus when rod 150 is moved downwardly by operation of the coin return lever, sleeve 152 will move downward with it until its collar 156 engages the top end 158 of rod 142. At that point sleeve 152 will begin to compress spring 154. The spring will compress to a limited extent only; when this limit is reached sleeve 152 will act to move rod 142 downward relative to rod 136. This lost motion connection between rod 142 and rod 136 is required in order to provide for actuation of rod 142 in the reverse direction when the carriage is moved upwardly during the vending operation. Thus when the carriage is moved upwardly by crank arm 56, rod 136 will move rod 142 in the same direction, but rod 142 will have no effect on rod 150 due to the fact that its upper end 158 will slide relative to sleeve 152.

The function of rod 142 is to actuate a pin 162 which is mounted in panel 70. One end of pin 162 engages an arm 170 formed integral with plate 102. As seen in FIGS. 14 and 15 rod 142 is provided with a recess defined by cam surfaces 172 and 174 for receiving pin 162. Pin 162 extends into this recess when rod 142 is at rest. However, if rod 142 is shifted upwardly or downwardly, cam surfaces 174 or 172, as the case may be, engage pin 162 and shift it axially toward arm 170 of plate 102. Pin 162 causes plate 102 to pivot away from panel 7 a distance sufficient to remove platforms 104, 106 and 108 out of supporting relation with coins 88, 90 and 96. When this occurs the coins are released as previously described.

In order to prevent the carriage from being operated in the absence of coins, suitable carriage locking means are provided. These means comprise a plurality of locking levers 180, 182 and 184 (see FIGS. 8 and 10–15). It is to be noted that the coin casting 78 by construction will accept nickels and dimes, but not enough of each to total 35¢. Hence to produce the total of 35¢ a quarter and also two nickels or a dime are required to be used. With this in mind it is believed apparent that in this case the number of locking levers corresponds to the maximum number of acceptable coins that can be used to achieve the exact total of 35¢.

Locking levers 180, 182 and 184 are pivotally mounted on rod 136. Springs 185 positioned between carriage 114 and the bottom ends of the locking levers act to pivot the locking levers about rod 136 in a clockwise direction as viewed in FIGS. 10–15. Each locking lever is provided adjacent its top end with an inclined cam surface 186, a horizontal or transverse shoulder 188, and an axially extending finger 190. The horizontal flange 128 of casting 78 is provided with three slots 192, 194 and 196 to accommodate the three locking levers.

Associated with levers 180 and 182 are identical auxiliary coin feeler levers 200 and 202 (FIGS. 8 and 13–15). Coin feeler lever 200 is provided with an elongated slot 204 which at its bottom end has an oblique portion 206 and an offset portion 208. A rivet 209 anchored in locking lever 180 extends through slot 204 and functions to slidably and pivotally connect locking lever 180 to feeler lever 200. At its top end feeler lever 200 is pivotally connected to a rod 210 attached to casting 78. Coin feeler lever 200 is provided with two fingers which are hereinafter identified as nickel feeler finger 212 and dime feeler finger 214. Coin feeler lever 202 and locking lever 182 are pivotally and slidably connected in the same way. Feeler lever 202 also is pivotally secured to rod 210 and its fingers are identified as nickel feeler finger 216 and dime feeler finger 218. Coin casting 78 is provided with two openings 220 and 222 through which the fingers of feeler levers 200 and 202 may be inserted (as hereinafter described) to contact nickels and dimes supported within the coin casting by platform 104 and flange 108.

Associated with locking lever 184 is an auxiliary lever 224 which is similar in all respects to auxiliary feeler levers 200 and 202 except that it has no fingers. Lever 224 also is pivotally attached to rod 210. Locking lever 184 and its associated lever 224 are positioned in line with a quarter 96 supported on platform 106. Looking to FIGS. 8, 10 and 11 there is illustrated a feeler plate 228 which is pivotally secured at 230 and 232 to rod 210. At its bottom edge feeler plate 228 has an extension 234 which is provided with a flange 236 directed toward lever 224 and a finger 238 which is directed toward coin casting 78. Casting 78 and panel 70 are provided with openings 240 and 242 respectively through which the finger 238 extends for engagement with a quarter 96 supported on platform 106.

Figure 10:
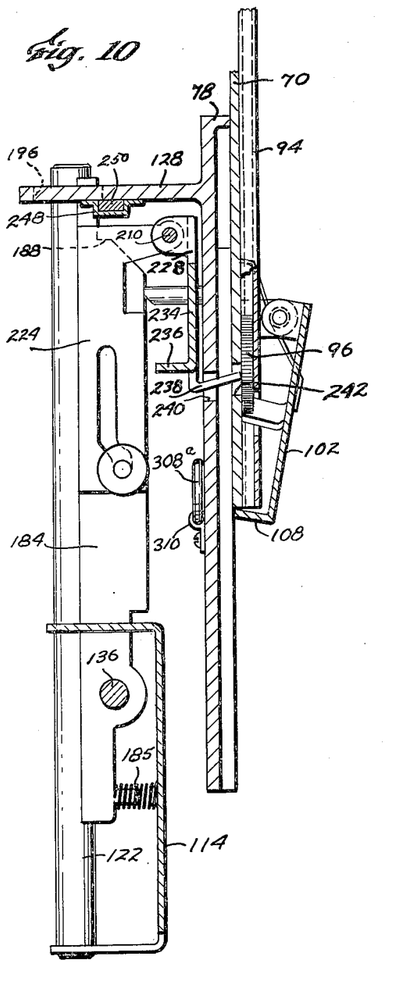
FIGS. 10, 11 and 12 are sectional views in elevation along lines 10—10, 11—11, and 12—12 of FIG. 8.
Figure 11:
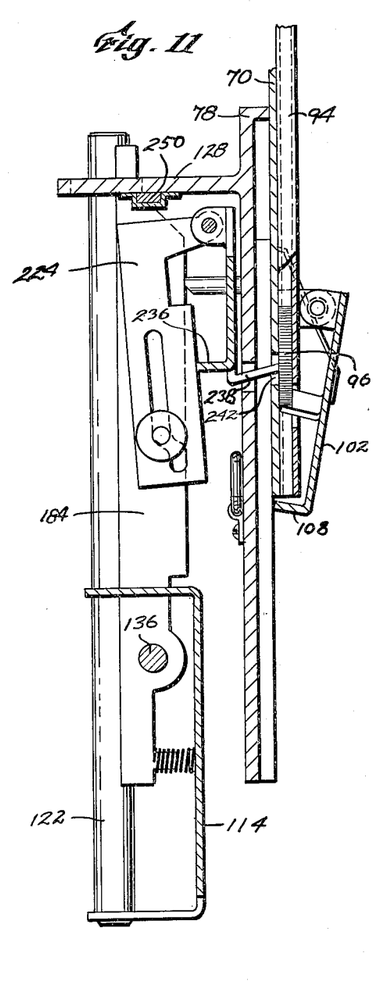
Figure 12:
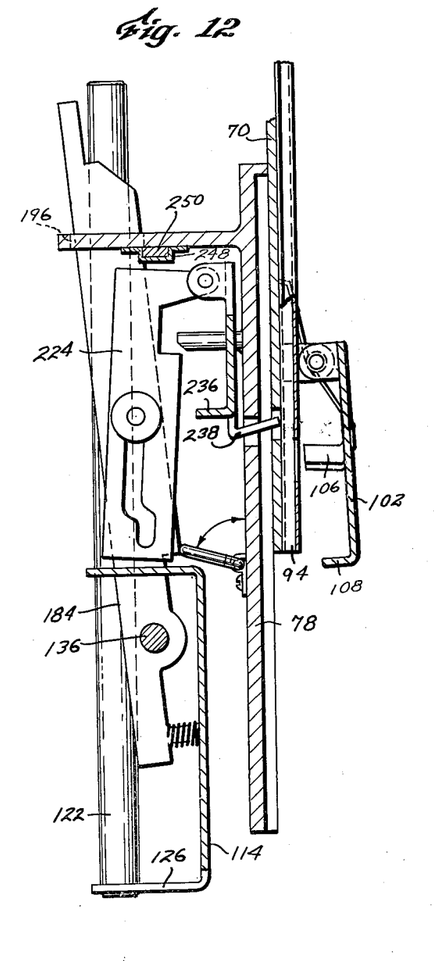
Figure 13:
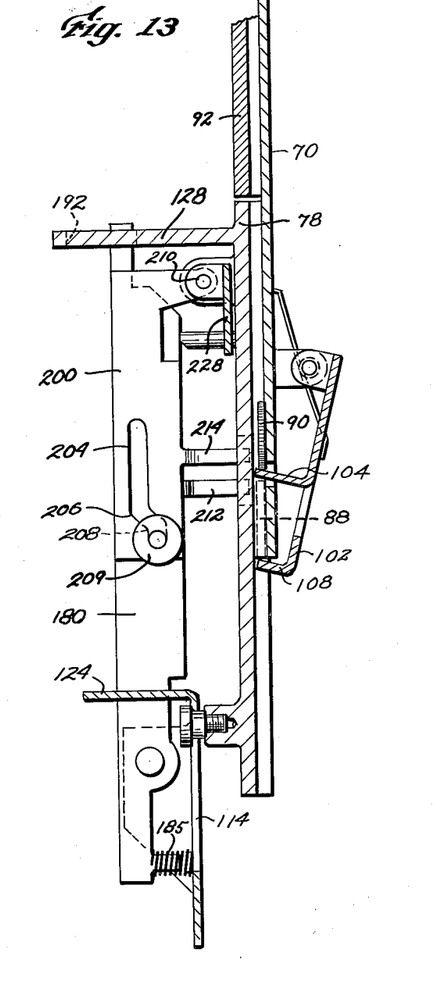
FIGS. 13, 14 and 15 are sectional views taken along lines 13—13, 14—14 and 15—15 of FIG. 8.
Figure 18:
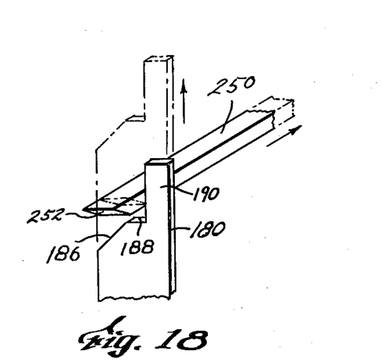
FIG. 18 is a fragmentary view in perspective of certain elements illustrated in FIGS. 8, 10–12, 16 and 17.

Attached to the underside of flange 128 of casting 78 is a channel member 248 which slidably supports a locking bar 250. While not shown in FIGS. 13-15, it is to be understood that the channel member 248 terminates just short of locking lever 180, as shown in FIG. 8. As shown in FIGS. 10 and 11 the locking bar slightly overlaps the rear edge of slots 192, 194 and 196 so as to be engaged by the horizontal shoulders 188 of these bars when the locking levers are shifted upwardly a slight amount by corresponding movement of the carriage. The forward or left hand end of bar 250 projects slightly beyond the corresponding end of channel member 248 so as to terminate directly behind the finger 190 of locking lever 180 (FIG. 18). This forward end of bar 250 is beveled to provide an inclined cam surface 252 which, when engaged by shoulder 188 of the locking lever, will cause bar 250 to shift to the right out of the path of the locking lever so that the latter can continue to move upwardly without restraint by bar 250.

The right hand or rear end of bar 250 also projects slightly beyond the corresponding end of channel member 248. Extending at a right angle to locking bar 250 is a lever 254 adapted to control movement of the locking bar relative to channel 248. Lever 254 is provided with an elongated slot 256 through which extends a screw 260 attached to a bracket 262 formed integral with casting 78. The slot permits lever 254 to be shifted relative to screw 260 and locking bar 250. The upper end of lever 254 is slotted to provide two parallel arms 264 and 266 which extend through a suitable slot provided in casting flange 128. The bottom edge 268 of the slot is above bar 250 when lever 254 is in its up position and is below the bar when the lever is in its down position. A spring 269 connected to flange 128 and lever 254 acts to keep the lever in its up position. In this up position the lever prevents locking bar 250 from shifting to the right when its beveled surface 252 is engaged by shoulder 188 of locking lever 180, thereby preventing lever 180 and carriage 114 from moving upwardly to execute the full stroke required to complete the vending operation. Attached to the upper end of lever 254 is a flexible leaf spring 270 which extends above the lower edge 268 of the slot defined by arms 264 and 266. This leaf spring acts as a yieldable barrier to locking bar 250 when lever 254 is shifted to its down position. Hence locking bar 250 can be cammed to the right by locking lever 180 when lever 254 is lowered. Leaf spring 270 functions to return bar 250 to its original position when locking lever 180 is returned to its normal at rest position.

Also controlled by lever 254 is small plate 274 pivotally secured to the plate 228. Plate 274 has an arm 276 which is loosely received in an opening 278 provided in lever 254. Plate 274 also has a flange 280 which extends away from casting 78. Pivotally carried by rod 136 is an operating lever 282. A compression spring 284 urges the bottom end of lever 282 away from carriage 114. Lever 282 extends through a slot 286 in casting flange 128 and is provided with a bent portion 288 at its top end.

Figure 16:
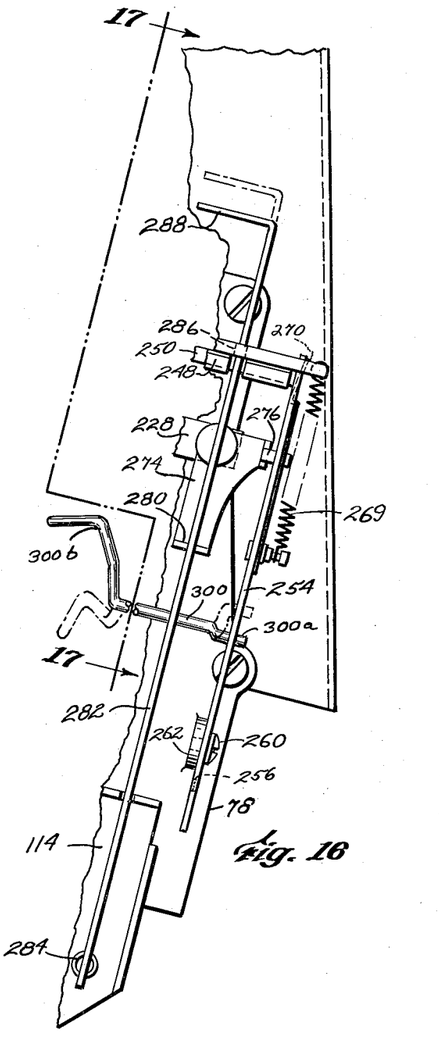
FIG. 16 is a fragmentary view showing a portion of the apparatus illustrated in FIG. 8.

Lever 282 is provided with a projection 290 having an inclined cam surface 292 adapted to engage flange 280 when lever 254 is in its down position (FIG. 16).

Lever 254 is drawn downwardly against the pull of spring 268 by means of a wire rod 300 (FIGS. 1, 8, 16 and 17) which is rotatably secured to casting 78 by means of a removable bracket 302. At its rear end rod 300 has an offset portion 300a which extends into an opening 304 provided in lever 254. At its front end rod 300 has a bent portion 300b which extends through a suitable slot 306 in panel 70 and a corresponding slot in panel 4.

Bracket 302 also acts to secure a second wire rod 308 to casting 78. A second bracket 310 is also used to rotatably secure the rear end of rod 308 to the casting. Rod 308 has an offset portion 308a intermediate brackets 302 and 310. Offset portion 308a passes behind locking levers 180 and 182. As shown in FIGS. 8, 10 and 11, the normal position of offset portion 308a is flat against coin casting 78. The forward end 308b of rod 308 extends through a suitable slot in flange 70a of panel 70 and is bent toward but stops short of side panel 4.

Rotatably secured to and extending between side panels 2 and 4 is a bar 312. Rotatably secured to bar 312 by means of arms 314 and 316 is an angle iron bar 318. Secured to bar 312 adjacent panel 4 is a wire rod 320 which extends forwardly beneath bar 318, as at 322, then is inclined upwardly toward panel 4 as at 324, and finally is bent rearwardly as at 326, beneath the bent end 300b of wire rod 300. Attached to angle iron bar 318 is a second wire rod 328 which extends forwardly as at 330, horizontally in front of the inclined edge 4a of side panel 4 as at 332, and then rearwardly and downwardly as at 334 beneath the bent end 308b of wire rod 308.

Figure 4:
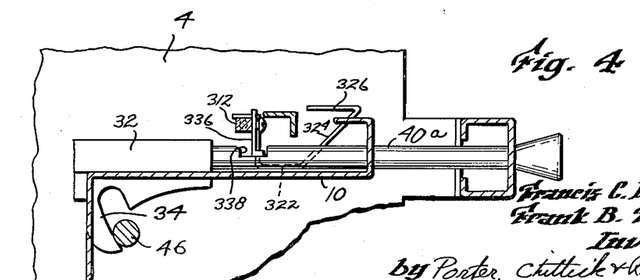
FIG. 4 is a sectional view taken along line 4—4 of FIG. 1.
Figure 5:
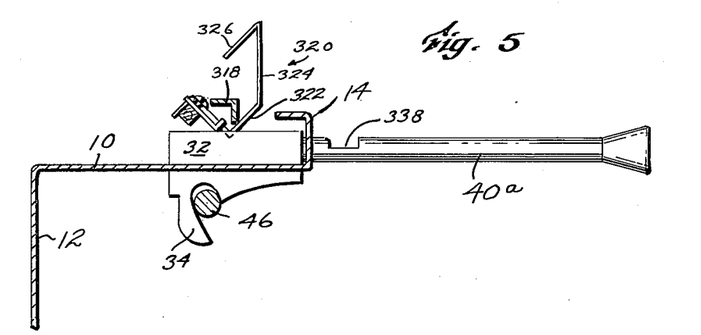
FIG. 5 is like FIG. 4, but with the operating handle pulled out.
Figure 6:
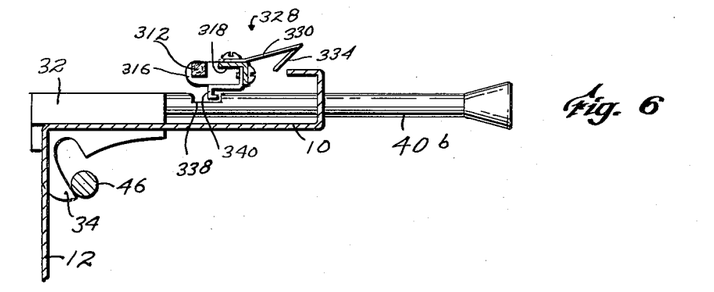
FIG. 6 is a sectional view taken along line 6—6 of FIG. 1.
Figure 7:
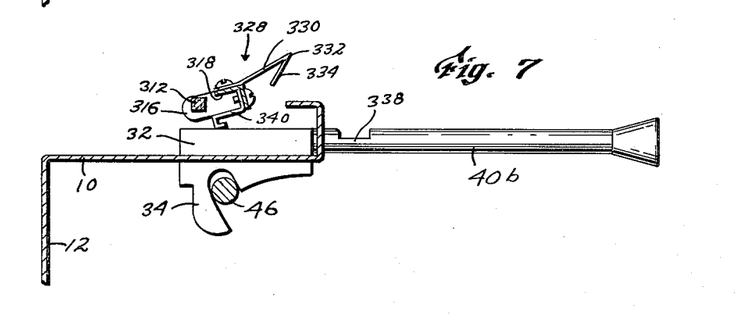
FIG. 7 is a view like FIG. 6, but with the operating handle pulled out.

Bar 312 is also provided with a depending removable tab 336. Tab 336 is positioned so that it will rest in a notch 338, provided in operating handle 40a, when the operating handle is in its rear or at rest position (FIG. 4). Bar 318 is also provided with a removable tab 340 which also extends into a notch 338 provided in another operating handle 40b. It is to be noted (FIGS. 1, 2 and 3) that no tab is associated with operating handle 40c. Although only three operating handles are shown, it is to be understood that a conventional machine adapted to vend articles, such as cigarettes, is usually provided with more than three operating handles. Accordingly, a machine embodying the present invention may have several tabs 336 and 340, each associated with one of the operating handles. As explained hereinafter these tabs, according to their presence or absence, determine the amount in coin required to be deposited for purchase of the various articles stored in the machine.

Operation of the machine is as follows:

Assuming now that customer desires to purchase a pack of cigarettes costing 25¢, it will be necessary for the customer to deposit a quarter in the machine. The quarter will drop through chute 94 until it comes to rest on platform 106. Thereafter the operator will pull out operating handle 40b. As handle 40b is drawn forward tab 340 will be moved forward, causing bar 318 to rotate counterclockwise (FIGS. 6 and 7) about rod 312. Wire rod 328 will move upwardly and its end portion 334 will engage the end portion 308b of wire rod 308, causing the latter to rotate relative to the coin casting. The direction of rotation of wire rod 308 is such as to move the offset portion 308a away from the coin casting 78 toward feeler levers 200 and 202. As the operating handle 40b is drawn forward its hook 34 engages operating bar 46, drawing the latter forward. As a result crank arm 56 operates through its rotatable member 58 to move carriage 114 upwardly. As this occurs the feeler levers 200 and 202 tend to pivot inwardly toward coin casting 78. However, the offset portion 308a of rod 308 limits this inward movement of the feeler levers. With the feeler levers in engagement with the offset portion 308a of rod 308, the locking levers 180 and 182 tend to pivot outwardly of coin casting 78 about rod 136 as carriage 114 is moved upwardly. This outward movement of locking levers 180 and 182 causes them to bypass bar 250 and channel member 248. Once the locking levers have been cammed outwardly of locking bar 250, they are free to move upwardly through the slots provided in flange 128 of the coin casting. However, in order for carriage 114 to be moved upwardly through its complete stroke, it is also necessary for locking lever 184 to be cammed outwardly so as to bypass locking bar 250. This is accomplished by plate 228 which is supported by the quarter resting on coin platform 106. As seen in FIGS. 10 and 11, when a quarter is positioned on platform 106, the finger 238 of plate 228 is in position to engage the quarter. Thus as the carriage 114 moves upwardly a slight distance, locking lever 184 acts to pivot feeler lever 224 inwardly toward the coin casting. The feeler lever thus engages the flange 236 of coin plate 228. In the absence of a quarter on platform 106, the feeler lever 224 would cause the plate 228 to pivot toward the coin casting so that the finger 238 would extend into chute 94. With the feeler lever 224 unsupported by a coin on platform 106, the locking lever 184 would move upwardly in a straight line until its shoulder 188 engaged the locking bar 250. When this occurred, upward movement of carriage 114 would cease. However, when a coin is present on platform 106, plate 228 will not be effected by feeler member 224. Instead it will resist movement by feeler member 224 and will, when engaged by the latter, hold the latter in such a position as to cause the locking lever 184 to be cammed outwardly to an inclined position wherein it will bypass locking bar 250 and move upwardly through the slot provided in flange 128. The carriage 114 will then be free to move through its entire operating stroke.

Should an operator attempt to operate one of the other handles 40a or 40c, the machine will not operate since more than 25¢ is required to be deposited in the machine in order for one of the other two handles to be operated. Thus if operating handle 40c is operated, the locking bars 180 and 182, being unsupported by coins positioned in coin casting 78, will be locked against movement by carriage 114. When locking levers 180 and 182 are moved upwardly a slightly distance, in the absence of two nickels or a dime, their feeler levers 200 and 202 will move inwardly of the casting. Without coins to support fingers 212, 214, 216, and 218, the feeler levers will pivot inwardly as shown in FIG. 14, and thus be incapable of camming the locking bars outwardly of locking bar 250. However, when a dime or two nickels are present in the casting, the feeler levers will be supported by these coins. Hence as the locking levers are shifted upwardly a slight amount by carriage 114, the feeler levers will act to cam the locking levers away from the casting into bypassing relation with locking bar 250. If an attempt is made to operate lever 40a with only a quarter deposited in the machine, the carriage 114 will still be locked against upward movement. It is to be noted that when operating handle 40a is drawn outwardly, wire rod 320 will engage the end 300b of rod 300, causing the latter to rotate in a direction to lower lever 254. This frees locking bar 250 so that it may be cammed to the right by locking lever 180 as the latter is moved upward a slight amount. However, locking lever 182 will still engage locking bar 250 since its feeler lever 202 is unsupported by a coin in the casting.

When a quarter and a nickel are inserted in the machine, operating handle 40a may be operated. When this handle is operated it will cause wire rod 300 to rotate so as to lower lever 254 and free locking bar 250 so that it may be cammed to the right by locking lever 180 as the latter is moved upwardly a slight amount. The quarter will support feeler lever 224 so as to cause locking lever 184 to be cammed outwardly into bypassing relation with locking bar 250. Locking lever 182 will also bypass locking bar 250 since its feeler lever 202 will be supported by a nickel 88 positioned in the coin casting.

When it is desired to purchase an article selling at a price of 35¢, the operator must insert in the machine a quarter and two nickels or a dime. Then he must operate handle 40c. Since handle 40c is not associated with means for pivoting locking levers 180 and 182, as is the case with operating handles 40a and 40b, it is believed apparent that carriage 114 can be moved through its complete stroke only if all three locking levers 180, 182 and 184 are cammed outwardly of locking bar 250. This condition is met by the presence of a quarter and two nickels or a dime. A quarter will act through feeler lever 224 to cam locking lever 184. A dime 90 will engage fingers 214 and 218 so as to support feeler levers 200 and 202. Two nickels 88 will engage the fingers 212 and 216 of feeler levers 200 and 202 so as to support the latter in the same way they are supported by a single dime 90. With feeler levers 200 and 202 supported by a dime or two nickels, locking levers 180 and 182 will be cammed by the feeler levers so as to bypass locking bars 250.

Figure 17:
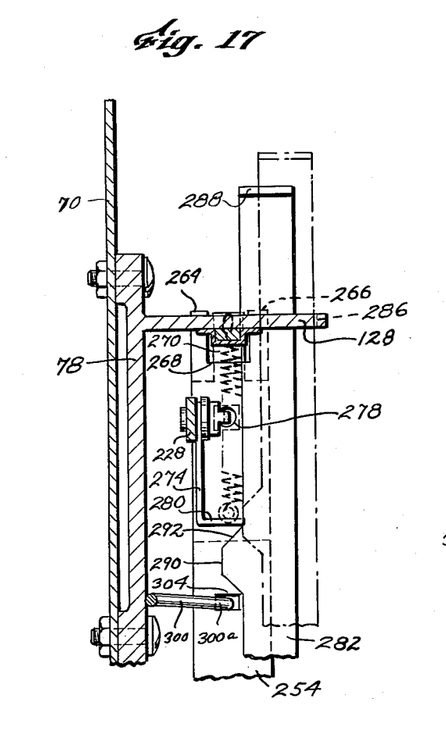
FIG. 17 is a sectional view in elevation taken along line 17—17 of FIG. 16; and, :::
::: {.column}

It is to be noted that lever 282 is adapted to be operated by plate 274. So long as lever 254 is in the position illustrated in FIG. 8, plate 274 will not have any operating effect on lever 282. However, when lever 254 is lowered by rotation of rod 300, the flanged portion 280 of plate 274 will be shifted into position behind lever 282 just above its inclined cam surface 292. Thereafter, as carriage 114 is moved upwardly through its operating stroke, flange 280, by virtue of its engagement with cam surface 292, will cause lever 282 to pivot about rod 136 away from casting 278. The positions occupied by lever 282 before and after cam surface 292 has passed above flange 280, are illustrated in FIGS. 8, 16, and 17. Suffice it to state that lever 282 is adapted to operate a change maker assembly (not shown) which is to be mounted on removable panel 70 above coin casting 78. Such a change maker is described and illustrated in our aforementioned patent. When lever 282 is camed away from panel 70 during upward movement of carriage 114, it will operate the change maker assembly. However, if lever 282 is not cammed away from the coin casting during upward movement of carriage 114, it will be in an inoperative position relative to the change maker assembly.

In the present case the change maker assembly should be adapted to return nickels since it is operated only when operating handle 40a is actuated. Operating handle 40a requires the presence of 30¢ in the machine. Since the customer may have a quarter and a dime but no nickels, it is useful to provide for return of a nickel so that the customer may use a dime instead of a nickel. Thus if the customer inserts a quarter and a dime, the dime will act to support feeler levers 200 and 202 making release of locking bar 250 unnecessary. However, when operating handle 40a is operated, it will not only operate lever 254, but also operate plate 274 which acts to cam lever 282 into position to operate the change maker assembly. Thus the 30¢ article will be vended and the operator will have returned to him a nickel in change.

It is to be understood that coin casting 78 may be modified to as to accept other coins. Thus, for example, coin chute 94 may be replaced by a wider chute adapted to accommodate 50¢, and wall portions 80, 82, 84 and 86 of coin casting 78 may be spaced from each other a greater amount so that the two nickels may be replaced by two quarters and the dime may be replaced by a single 50¢ coin. With the aforesaid changes a machine constructed according to this invention will be adapted to vend articles at prices of 50¢ 75¢, and $1.00 in coins. Correspondingly, the change maker assembly could be modified to deliver quarters instead of nickels.

Obviously many modifications and variations of the present invention are possible in the light of the above teachings. Therefore, it is to be understood that the invention is not limited in its application to the details of construction and arrangement of parts specifically described or illustrated, and that within the scope of the

We claim:

1. A vending machine comprising an article-storing magazine divided into a plurality of compartments, an article ejector for each compartment, a plurality of operating handles each connected to one of said ejectors, said handles being movable through a predetermined operating stroke to cause said ejectors to remove articles from said compartments, coin-controlled mechanism normally preventing all of said handles from being moved through said fixed stroke but permitting said handles to move through a limited part of said stroke, coin-controlled mechanism comprising a shaft positioned to be moved by each of said operating handles, a fixed mounting panel, a carriage movable relative to said panel, means connecting said shaft and carriage for moving said carriage relative to said panel when said shaft is moved by one of said operating handles, a plurality of locking levers totaling at least three in number pivotally carried by said carriage, a locking bar carried by said panel in position to intercept each of said locking levers when said carriage is moved a predetermined distance upon operation of any operating handle through said limited part of said stroke, whereby to prevent said any handle from moving fully through said operating stroke, a coin platform for supporting thereon at several positions a plurality of coins of one or more denominations, a coin chute for directing coins to said platform, a plurality of auxiliary levers, one auxiliary lever for each locking lever, each auxiliary lever being pivotally attached to said panel, a plurality of coin feeler elements each positioned to engage a coin at a different one of said several positions on said platform and to support one of said auxiliary levers against pivotal movement in one direction relative to said panel when in engagement with a coin on said platform, means connecting each auxiliary lever with one of said locking levers for camming said locking levers into position to bypass said locking bar when said auxiliary levers are supported against pivotal movement in said one direction and said carriage is moved through said predetermined distance by operation of one of said handles, thereby to free said carriage to permit the operating handle to complete said operating stroke, first selectively operated price differential mechanism for freeing said carriage when the coins deposited in the machine are insufficient in number to support a certain two of said auxiliary levers, said first price differential mechanism comprising a rod rotatably supported by said panel and having cam means for engaging and supporting said two auxiliary levers against pivotal movement in said one direction, and means operated by only certain ones of said handles when said certain handles are moved through said limited part of said stroke for rotating said rod to place said cam means in supporting engagement with said two auxiliary levers, and second selectively operated price differential mechanism for freeing said carriage when the coins deposited in the machine are insufficient in number to support both of said two auxiliary levers, said second price differential mechanism comprising normally locked displaceable means in said locking bar which when released permits movement through said locking bar of the locking lever attached to one of said two auxiliary levers, and means operated by handles other than said certain handles for releasing said displaceable means.

2. Coin controlled mechanism for vending machines comprising a mounting panel, a movable coin platform having coin supports thereon for a plurality of coins of one or more dimensions, a coin chute for directing coins to said platform, a locking bar carried by said panel, a carriage movable a fixed stroke relative to said locking bar for completion of the vending operation, said carriage having a plurality of locknig levers, said locking levers normally in a position to engage said locking bar upon slight upward movement of said carriage, said locking bar acting when engaged by any one of said locking levers to prevent movement of said carriage fully through said fixed stroke, a like plurality of coin controlled auxiliary levers pivotally carried by said mounting panel, said auxiliary levers each being slidably attached to one of said locking levers and operative upon said slight upward movement of said carriage when supported by a coin on said platform to cam the locking lever associated therewith out of said normal position to bypass said locking bar, first selectively operated price differential mechanism for freeing said carriage when all but a predetermined number totaling at least two of said auxiliary levers are supported by coins on said platform, and second selectively operated price differential mechanism for freeing said carriage when all but one of said auxiliary levers are supported by coins on said platform, said first price differential mechanism including a single movable member for moving into bypass position all of the locking levers attached to said predetermined number of auxiliary levers, and means selectively actuatable by a customer for operating said single movable member, said second price differential mechanism comprising normally locked displaceable means in the locking bar which when released permits movement through said locking bar of the locking lever attached to one of said predetermined number of auxiliary levers, and means selectively actuatable by a customer for releasing said displaceable means.

References Cited in the file of this patent

UNITED STATES PATENTS

| | | |
|---|---|---|
| 2,037,462 | Du Grenier | Apr. 14, 1936 |
| 2,207,902 | Steiner | July 16, 1940 |
| 2,429,148 | Wilder | Oct. 14, 1947 |
| 2,453,398 | Auerbach | Nov. 9, 1948 |
| 2,529,196 | Stoner | Nov. 7, 1950 |
| 2,655,244 | Stoner | Oct. 13, 1953 |
| 2,726,749 | Du Greiner et al. | Dec. 13, 1955 |
| 2,777,554 | Steiner | Jan. 15, 1957 |